United States Patent
Nakajima et al.

(10) Patent No.: US 7,382,414 B2
(45) Date of Patent: Jun. 3, 2008

(54) VIDEO SIGNAL PROCESSING APPARATUS, FOR CONTROLLING CONTRAST COMPENSATION AND EDGE COMPENSATION IN RELATION TO EACH OTHER IN DEPEDENCE ON LUMINANCE OF AN IMAGE, AND TELEVISION RECEIVER INCLUDING THE SAME

(75) Inventors: Mitsuo Nakajima, Yokohama (JP); Yasutaka Tsuru, Kamakura (JP); Takaaki Matono, Yokohama (JP); Haruki Takata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 501 days.

(21) Appl. No.: 10/998,163

(22) Filed: Nov. 29, 2004

(65) Prior Publication Data

US 2005/0128358 A1    Jun. 16, 2005

(30) Foreign Application Priority Data

Dec. 10, 2003   (JP)   ............................... 2003-411178

(51) Int. Cl.
  *H04N 5/21* (2006.01)
  *H04N 5/52* (2006.01)
(52) U.S. Cl. ........................ 348/625; 348/678; 348/672
(58) Field of Classification Search ........ 348/671–673, 348/678, 625, 790, 252; 382/266, 168, 170, 382/274; 345/77, 89, 102, 617
See application file for complete search history.

(56) References Cited

U.S. PATENT DOCUMENTS

| | | | | |
|---|---|---|---|---|
| 5,224,177 A | * | 6/1993 | Doi et al. | .................... 382/168 |
| 5,271,064 A | * | 12/1993 | Dhawan et al. | ............. 382/266 |
| 5,867,610 A | * | 2/1999 | Lee | ............................. 382/283 |
| 6,040,860 A | | 3/2000 | Tamura et al. | |

(Continued)

FOREIGN PATENT DOCUMENTS

| | | |
|---|---|---|
| JP | 5-56308 A | 3/1993 |
| JP | 8-056316 A | 2/1996 |
| JP | 8-107519 | 4/1996 |
| JP | 9-233342 A | 9/1997 |
| JP | 2000-152033 A | 5/2000 |
| JP | 3215400 | 7/2001 |

OTHER PUBLICATIONS

Japanese Office Action, with English Translation, issued in Japanese Patent Application No. 2003-411178, dated on Dec. 25, 2007.

*Primary Examiner*—Victor R. Kostak
(74) *Attorney, Agent, or Firm*—McDermott Will & Emery LLP

(57) ABSTRACT

A video signal processing apparatus includes a characteristic detection circuit for detecting luminance distribution corresponding to one frame of a video signal, a contrast compensation circuit for compensating contrast of the video signal, an edge compensation circuit for compensating an edge portion of the video signal, and a control circuit for determining a luminance range to be controlled on the basis of the luminance distribution detected by the characteristic detection circuit, and controlling the contrast compensation circuit and edge compensation circuit to conduct predetermined compensation on the video signal belonging to the luminance range. The control circuit controls the contrast compensation circuit to increase contrast for the video signal in the luminance range as compared with the video signal in other regions, and controls the edge compensation circuit to make an edge compensation quantity for the video signal in the luminance range smaller as compared with other regions.

12 Claims, 6 Drawing Sheets

U.S. PATENT DOCUMENTS

| | | | |
|---|---|---|---|
| 6,118,886 A * | 9/2000 | Baumgart et al. | 382/103 |
| 6,118,907 A * | 9/2000 | Matama | 382/274 |
| 6,137,899 A * | 10/2000 | Lee et al. | 382/133 |
| 6,989,858 B2 * | 1/2006 | Kinjo | 348/218.1 |
| 7,158,107 B2 * | 1/2007 | Kawabe et al. | 345/89 |
| 2002/0027618 A1 * | 3/2002 | Stessen et al. | 348/625 |

* cited by examiner

CORING INPUT-OUTPUT CHARACTERISTICS

GAIN CONTROL INPUT-OUTPUT CHARACTERISTICS

OVERALL INPUT-OUTPUT CHARACTERISTICS

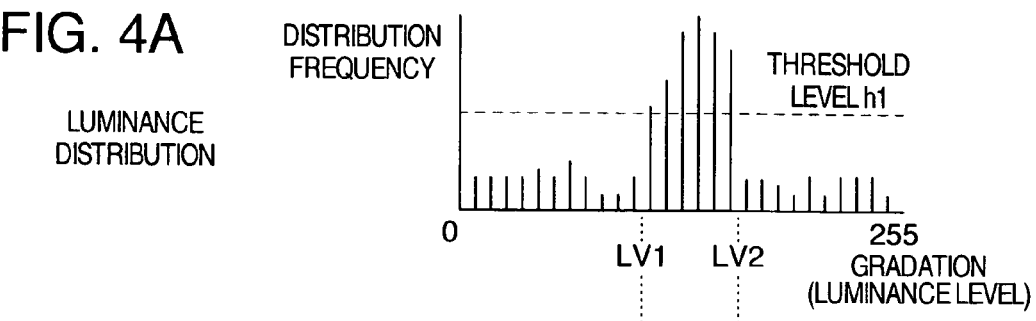
FIG. 4A  LUMINANCE DISTRIBUTION
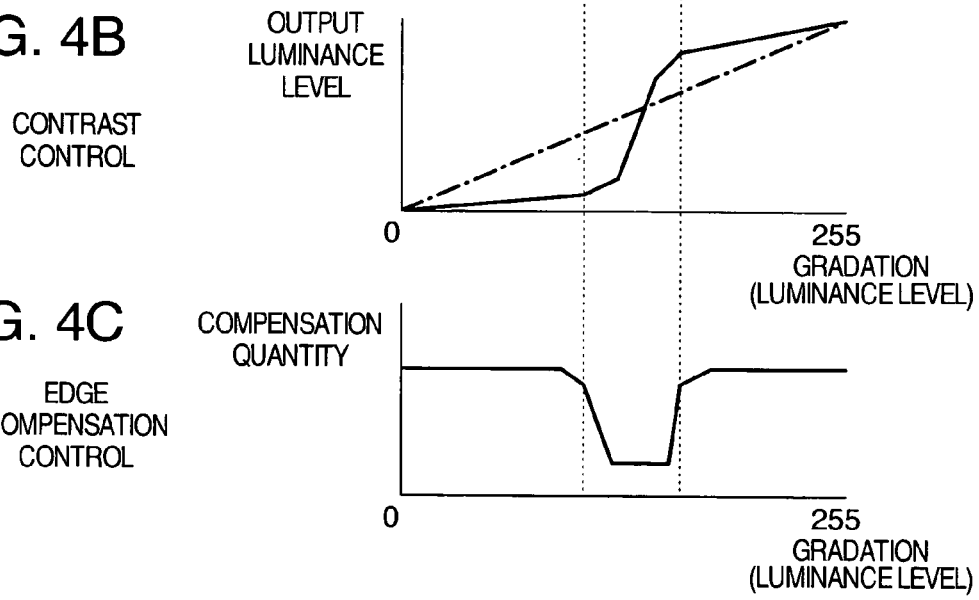
FIG. 4B  CONTRAST CONTROL
FIG. 4C  EDGE COMPENSATION CONTROL
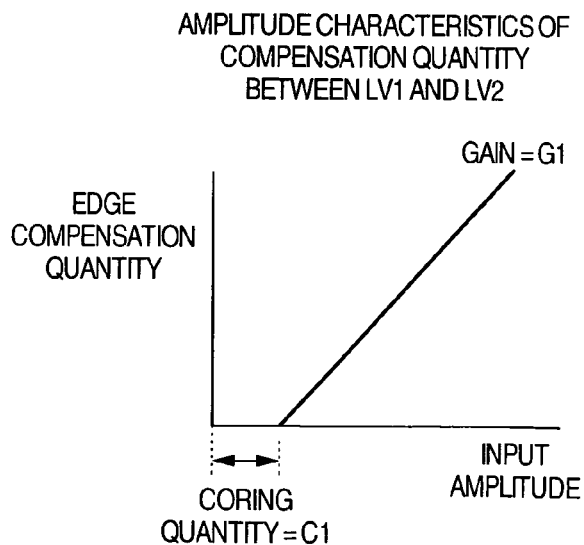
FIG. 4D  AMPLITUDE CHARACTERISTICS OF COMPENSATION QUANTITY BETWEEN LV1 AND LV2
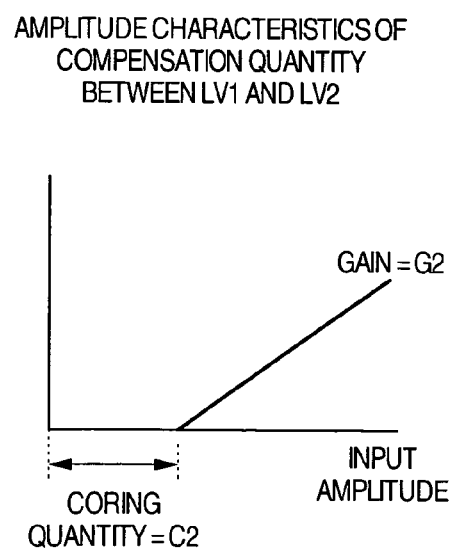
FIG. 4E  AMPLITUDE CHARACTERISTICS OF COMPENSATION QUANTITY BETWEEN LV1 AND LV2

LUMINANCE DISTRIBUTION

CONTRAST CONTROL

EDGE COMPENSATION CONTROL

CORING CONTROL

SIGNAL AMPLITUDE

CONTRAST CONTROL

EDGE COMPENSATION CONTROL

VIDEO SIGNAL PROCESSING APPARATUS, FOR CONTROLLING CONTRAST COMPENSATION AND EDGE COMPENSATION IN RELATION TO EACH OTHER IN DEPEDENCE ON LUMINANCE OF AN IMAGE, AND TELEVISION RECEIVER INCLUDING THE SAME

INCORPORATION BY REFERENCE

The present application claims priority from Japanese application JP2003-411178 filed on Dec. 10, 2003, the content of which is hereby incorporated by reference into this application.

BACKGROUND OF THE INVENTION

This invention relates to a video signal processing apparatus that conducts signal processing such as contrast adjustment and edge compensation on a video signal, a TV receiver using such a video signal processing apparatus, and a video signal processing method.

As a conventional technique concerning the contrast compensation function in TV receivers, a technique of detecting a maximum level and a minimum level of a video luminance signal and an average luminance level and controlling the contrast compensation on the basis of these levels is known as described in, for example, Japanese Patent No. 3,215,400. As a conventional technique concerning the sharpness adjustment function, i.e., the edge compensation function, a technique of conducting edge compensation (emphasis) by extracting high frequency components in a video signal and adding the extracted high frequency components to the original image is known as described in, for example, JP-A-5-56308.

In the conventional technique described in Japanese Patent No. 3,215,400, a characteristic of an image is detected, and the signal gain is controlled so as to improve the contrast according to the dynamic range of a display apparatus. When the signal gain is increased, however, then the image amplitude becomes large and in addition noise components contained in the image are also amplified. On the other hand, the edge compensation in the edge compensation circuit is conducted by extracting the high frequency components in the horizontal and vertical direction from the video signal and amplifying the extracted high frequency components as described above. Since the noise components contained in the image also distribute in relative high frequency bands, not only the image edges but also the noise components are also amplified (emphasized) in some cases.

In other words, when the edge compensation is further conducted in a state in which compensation for increasing the contrast is being conducted, the noise components are amplified doubly. In an apparatus having these two compensation functions, therefore, the noise components becomes larger in a state in which the compensation for increasing the contrast is being conducted, and there is a possibility that the image becomes difficult to see in some images because of the influence of the noise. Heretofore, the problem of the noise emphasis in the case where the contrast compensation (especially the compensation for increasing the contrast) and the edge compensation are conducted simultaneously has not been considered.

SUMMARY OF THE INVENTION

This invention has been achieved in order to solve the problems. This invention provides a technique capable of providing an image with a high picture quality and less noise.

When conducting compensation on a video signal having a specific characteristic so as to increase its contrast, control is exercised so as to weaken the edge compensation, in accordance with this invention. Specifically, a video signal processing apparatus includes a detection circuit for detecting luminance distribution corresponding to one frame of a video signal, a contrast compensation circuit for compensating contrast of the video signal, an edge compensation circuit for compensating an edge portion of the video signal, and a control circuit for deciding a luminance range to be controlled on the basis of the luminance distribution detected by the detection circuit, and controlling the contrast compensation circuit and edge compensation circuit so as to conduct predetermined compensation on the video signal belonging to the luminance range. The control circuit controls the contrast compensation circuit so as to increase contrast for the video signal in the luminance range as compared with the video signal in other regions, and controls the edge compensation circuit so as to make an edge compensation quantity for the video signal in the luminance range smaller as compared with other regions.

The detection circuit counts pixels at respective gradation levels in the video signal corresponding to one frame, and detects luminance distribution on the frame, i.e., a histogram. A range of gradation levels each having more pixels than a predetermined number of pixels may be determined to the luminance range.

According to this invention, it becomes possible to obtain an image having a high picture quality with reduced noises.

Other objects, features and advantages of the invention will become apparent from the following description of the embodiments of the invention taken in conjunction with the accompanying drawings.

BRIEF DESCRIPTION OF THE DRAWINGS

FIGS. 4A to 4E show operation of a video signal processing apparatus according to this invention;

DETAILED DESCRIPTION OF THE EMBODIMENTS

Figure 1:
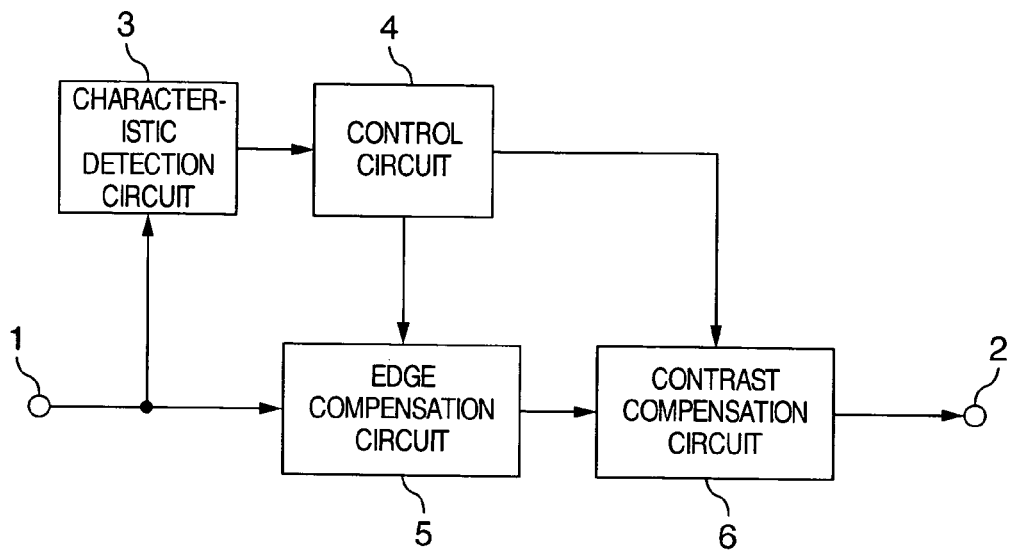
FIG. 1 is a block diagram showing an embodiment of a video signal processing apparatus according to this invention.

Hereafter, preferred embodiments of this invention will be described. FIG. 1 shows one embodiment of a video signal processing apparatus according to this invention. The video signal processing apparatus is used in apparatuses such as TV receivers. However, the video signal processing apparatus can be used in an apparatus that does not have a display unit, such as a VTR, DVD apparatus, or a digital tuner called set top box (STB) that receives a digital TV broadcast signal, in the same way.

In FIG. 1, a video signal having a digital form (hereafter simply referred to as video signal) is inputted to a video input terminal 1, and supplied to an image characteristic detection circuit 3 and an edge correction circuit 5. The characteristic detection circuit 3 detects a characteristic of the input video signal, for example, luminance distribution (a histogram) corresponding to one screen of the video signal, and outputs the detection result to a control circuit 4. The control circuit 4 functions to control the edge compensation circuit 5 and a contrast compensation circuit 6. The control circuit 4 makes a decision on a luminance range to be subjected to the contrast compensation and the edge compensation on the basis of the detection result, creates various control signals on the basis of the decision result, and outputs the various control signals to the edge compensation circuit 5 and the contrast compensation circuit 6. On the other hand, the edge compensation circuit 5 extracts high frequency components in the horizontal and vertical directions, i.e., edge portions of the input video signal, amplifies a signal in the edge portions by conducting coring and gain compensation, and adds the signal to the original video signal to obtain a video signal with the edge portions emphasized. The coring quantity and gain are controlled by the control circuit 4. The video signal outputted from the edge compensation circuit 5 is inputted to the contrast compensation circuit 6, and the video signal in the luminance range decided by the control circuit 4 is compensated so as to be increased in contrast. A contrast compensation quantity in the luminance range is determined by the control signal supplied from the control circuit 4. A video signal outputted from the contrast compensation circuit is supplied to a display unit such as a liquid crystal panel via a video output terminal 2.

Details of the circuits shown in FIG. 1 will now be described. First, details of the characteristic detection circuit 3 will now be described with reference to FIG. 4A. It is supposed that the video signal is represented by 8 bits in the ensuing description. The characteristic detection circuit 3 includes a function of successively detecting luminance levels of pixels in the video signal and counters (not illustrated) for counting the number of pixels at respective luminance levels. A plurality of counters are provided so as to be each associated with luminance levels (for example, eight gradation levels). Each of the counters counts the number of pixels belonging to the pertinent luminance levels. Here, the number of pixels is the number of pixels on a display panel of fixed pixel type such as a liquid crystal panel or a plasma display panel. For example, when a panel has 1024 by 1024 pixels in the horizontal and vertical directions, the number of pixels on the display panel becomes 1,048,756. Count results obtained by using the counters become, for example, as shown in Table 1.

TABLE 1

| Counter No. | Associated luminance levels (gradation levels) | Count value (number of pixels) |
| --- | --- | --- |
| Counter 1 | 0~7 | 2356 |
| Counter 2 | 8~15 | 48909 |
| Counter 3 | 16~23 | 10975 |
| Counter 4 | 24~32 | 7891 |
| ... | ... | ... |
| Counter 32 | 248~255 | 3890 |

The characteristic detection circuit detects a histogram on one screen of the input video signal as shown in, for example, FIG. 4A on the basis of the count results indicated above. This histogram has gradation levels (luminance levels) as the abscissa. Since the video signal is represented by 8 bits as described above, the abscissa assumes values ranging from 0 to 255. The ordinate represents the distribution frequency (the number of pixels). By creating such a histogram, it can be grasped on one screen which gradation levels are high in distribution (i.e., at which luminance levels the number of pixels is large).

The control circuit 4 makes a decision which gradation levels are high in distribution, i.e., in which luminance range the number of pixels is large, on the basis of the histogram obtained by the characteristic detection circuit 4. A predetermined threshold level h1 as shown in FIG. 4A is used in the decision processing. In other words, the number of pixels at each luminance level is compared with the threshold level h1. A luminance level range including the number of pixels higher than the threshold level h1 is determined to be the luminance range for controlling the edge compensation circuit 5 and the contrast compensation circuit 6. A first control signal representing information of the luminance range is outputted. It is now supposed that a range of LV1 to LV2 in luminance level over which the distribution frequency is higher than the threshold level h1 (i.e., the number of pixels is higher than the threshold level h1) is determined to be the luminance range. The control circuit 4 creates and outputs a first control signal, which represents the luminance range (LV1 to LV2), a second control signal for making the compensation quantity of the edge compensation smaller than that outside the luminance range, and a third control signal for increasing the contrast in the luminance range (as compared with other luminance ranges). The second control signal contains information concerning a coring quantity C and a gain control quantity G for the edge signal. The third control signal contains information concerning a contrast control quantity R.

Figure 2:
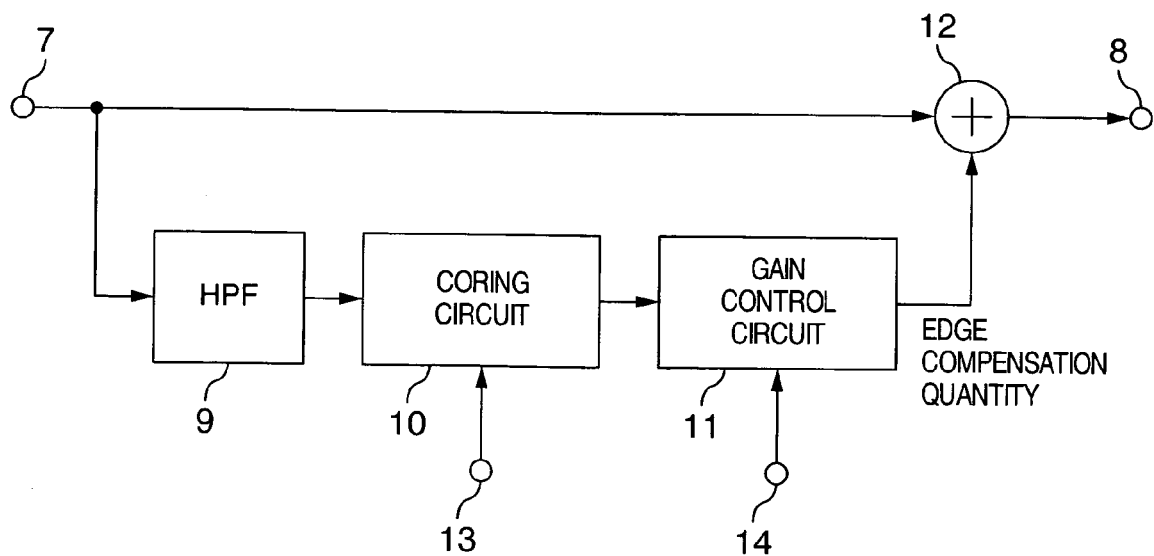
FIG. 2 is a block diagram showing an embodiment of an edge compensation circuit according to this invention.
Figure 3A:
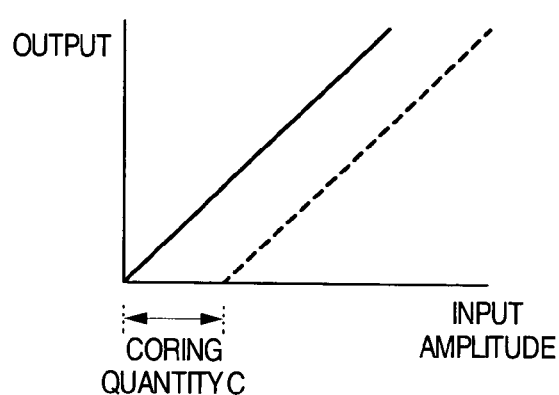
FIGS. 3A to 3C show operation of an edge compensation circuit according to this invention.

An example of the edge compensation circuit 5 will now be described with reference to FIG. 2. The video signal inputted to a video input terminal 7 is supplied to a high pass filter (HPF), and high frequency components, i.e., edge components in the image are extracted. The extracted edge components are supplied to a coring circuit 10 and subjected to coring processing with a coring quantity determined by the second control signal (the coring quantity C) supplied from the control circuit 4 and inputted to a coring quantity control terminal 13. An output signal from the coring circuit 10 is supplied to a gain control circuit 11. A gain of the gain control circuit 11 is adjusted by the second control signal (the gain control quantity G) supplied from the control circuit 4 and inputted to the gain control terminal 14. An output signal from the coring circuit 11 is added in an adder 12 to the original video signal (the signal inputted to the video input terminal 7). As a result, emphasis of the edge portions in the image, i.e., edge compensation is conducted. The high pass filter 9 may be a filter that extracts high frequency components in the horizontal direction, the vertical direction or the slant direction, or may be a filter that extracts high frequency components in a plurality of directions. Input-output characteristics of the coring circuit 10 and the gain control circuit 11 will now be described with reference to FIGS. 3A-3C. FIG. 3A shows an example of input-output characteristics of the coring circuit 10 (characteristics of coring control). The abscissa indicates inputted signal amplitude, and the ordinate indicates output signal amplitude. When the coring quantity C inputted to the coring quantity Control terminal 13 is 0 (C=0), then a relation that input=output is obtained as indicated by a solid line in FIG.

Figure 3B:
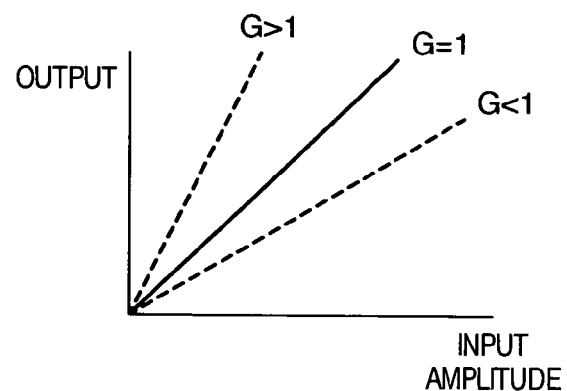
Figure 3C:
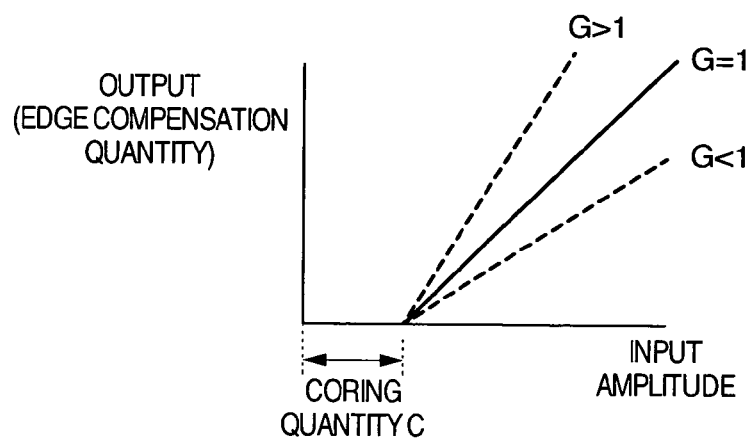

3A. On the other hand, when the coring quantity C inputted to the coring quantity control terminal 13 is not 0 (C>0), then the characteristic straight line is shifted by the coring quantity C as indicated by a broken line, and in resultant characteristics the output becomes 0 for an input amplitude less than the set coring quantity C (contained in the second control signal). FIG. 3B shows an example of input-output characteristics (gain control characteristics) of the gain control circuit. The abscissa indicates input signal amplitude, and the ordinate indicates output signal amplitude. When the gain control quantity G inputted to the gain control terminal 14 is 1 (G=1), then the relation that input=output is obtained as indicated by a solid line shown in FIG. 3B. On the other hand, when the gain control quantity G inputted to the gain control terminal 14 is 1 (G=1), the relation that input=output is obtained as indicated by a solid line in FIG. 3B. On the other hand, when the gain control quantity G inputted to the gain control terminal 14 is greater than 1 (G>1), then the inclination of the graph is great. Conversely, when the gain control quantity G is less than 1 (G<1), then the inclination of the graph becomes small. FIG. 3C shows overall characteristics of the coring control and the gain control. The output amplitude obtained in the overall characteristics becomes the edge compensation quantity. In other words, the edge compensation quantity obtained by the control circuit 4 is distributed among the coring quantity C and the gain control quantity G. By the way, although graphs in the negative direction are not shown FIGS. 3A, 3B and 3C, characteristics in the negative direction that are point-symmetrical to the characteristics in the positive direction with respect to the origin are obtained.

Subsequently, the contrast compensation circuit 6 will now be described. The contrast compensation circuit 6 conducts level conversion on the input signal on the basis of predetermined input-output characteristics, and outputs a resultant signal. The input-output characteristics may be linear or may draw a predetermined gamma curve. The input-output characteristics can be locally changed by a signal supplied from the outside. In other words, the contrast compensation circuit 6 according to this embodiment is constituted so that the input-output characteristics may be varied according to the luminance range (the level range of the input signal) represented by the first control signal supplied from the control circuit 4 and the contrast control quantity R contained in the third control signal.

An example of operation in the embodiment shown in FIG. 1 using the edge compensation circuit 5 and the contrast compensation circuit 6 heretofore described will now be described with reference to FIG. 4. As described above, the characteristic detection circuit 3 detects luminance distribution (histogram) corresponding to one frame of image shown in, for example, FIG. 4A, and the control circuit 4 determines a luminance range having higher distribution than the predetermined threshold level h1 on the basis of the detected luminance distribution. It is now supposed that the control circuit 4 determines the range of LV1 to LV2 to be the luminance region having high distribution. And the control circuit 4 outputs the first control signal, which indicates the luminance range of LV1 to LV2, as described above.

FIG. 4B shows the input-output characteristics of the contrast compensation circuit 6. The abscissa indicates an input luminance level, and the ordinate indicates an output luminance level. It is now supposed that the input-output characteristics are linear as indicated by a dot-dash line at the ordinary time (in a state in which the control signal is not inputted from the control circuit 4). The contrast compensation circuit 6 is controlled so as to make the inclination of the input-output characteristics steeper in the luminance range (the range of LV1 to LV2) indicated by the first control signal outputted from the control circuit 4 and make the inclination of the input-output characteristics gentler in luminance ranges having low luminance distribution (a luminance region below LV1 and a luminance region above LV2). At this time, the inclination of the input-output characteristics in the luminance range indicated by the first control signal is determined according to the contrast compensation quantity R contained in the third control signal supplied from the control circuit 4. The inclination of the input-output characteristics in portions other than the luminance range is also adjusted adaptively according to the contrast compensation quantity R contained in the third control signal. In this embodiment, the contrast at luminance levels having high distribution can be improved in one frame of image by exercising control described above.

FIG. 4C shows control characteristics of the edge compensation quantity in the edge compensation circuit 5. The first control signal supplied from the control circuit 4 is inputted to the edge compensation circuit 5 as well. The edge compensation circuit 5 is controlled so as to make the edge compensation quantity in the luminance range indicated by the first control signal (the range of LV1 to LV2) smaller than that in other regions (the luminance region below LV1 and the luminance region above LV2) as shown in FIG. 4C. In other words, the edge compensation circuit 5 is controlled by the control circuit 4 so as to decrease the compensation quantity in the luminance range (the range of LV1 to LV2) in which the luminance distribution is high and the input-output characteristics of the contrast compensation circuit 6 are made steeper (i.e., compensation is conducted so as to make the contrast higher) and so as to conversely increase the compensation quantity in the luminance range (the luminance regions below LV1 and the luminance regions above LV2) in which the luminance distribution is low and the input-output characteristics of the contrast compensation circuit 6 are made gentler (i.e., compensation is conducted so as to make the contrast lower).

FIG. 4D shows amplitude characteristics of the edge compensation quantity in the regions having low luminance distribution (the luminance regions below LV1 and the luminance regions above LV2). In this region, the edge compensation quantity is made large over a range from a small amplitude signal to a large amplitude signal by setting the coring quantity equal to a small value (C1) and setting the gain equal to a large value (G1). FIG. 4E shows amplitude characteristics of the edge compensation quantity in the luminance range (the region of LV1 to LV2) having high luminance distribution. In this range, the coring quantity is set to a large value (C2) and the gain is set to a small value (G2). As a result, compensation of a small-amplitude signal containing noise is suppressed, and the edge correction quantity is ensured for a large-amplitude signal.

Owing to the control heretofore described, the edge compensation is weakened when the contrast is compensated highly. Therefore, it is possible to prevent the contrast compensation circuit 6 and the edge compensation circuit 5 from amplifying the noise components doubly. According to this embodiment, therefore, it is possible to reduce noise at luminance levels increased in contrast and obtain an image having a high quality.

As the compensation control method in the edge compensation circuit 5, there is the method using the coring control and gain control as described above. As for how to use, it is effective to control the compensation quantity on the basis of the coring quantity in an image that abounds with comparatively small-amplitude noises such as an analog image. In this case, it is possible to emphasize the original image having comparatively large amplitudes without amplifying the noise components having small amplitudes. A digital image abounds with comparatively large-amplitude noises such as mosquito noises and block noises generated by digital compression and expansion. For the digital image, therefore, it is effective to reduce the noise by controlling the compensation quantity by means of the gain control. In addition, it is a matter of course that control obtained by combining the coring control with the gain control is also effective.

Figure 5:
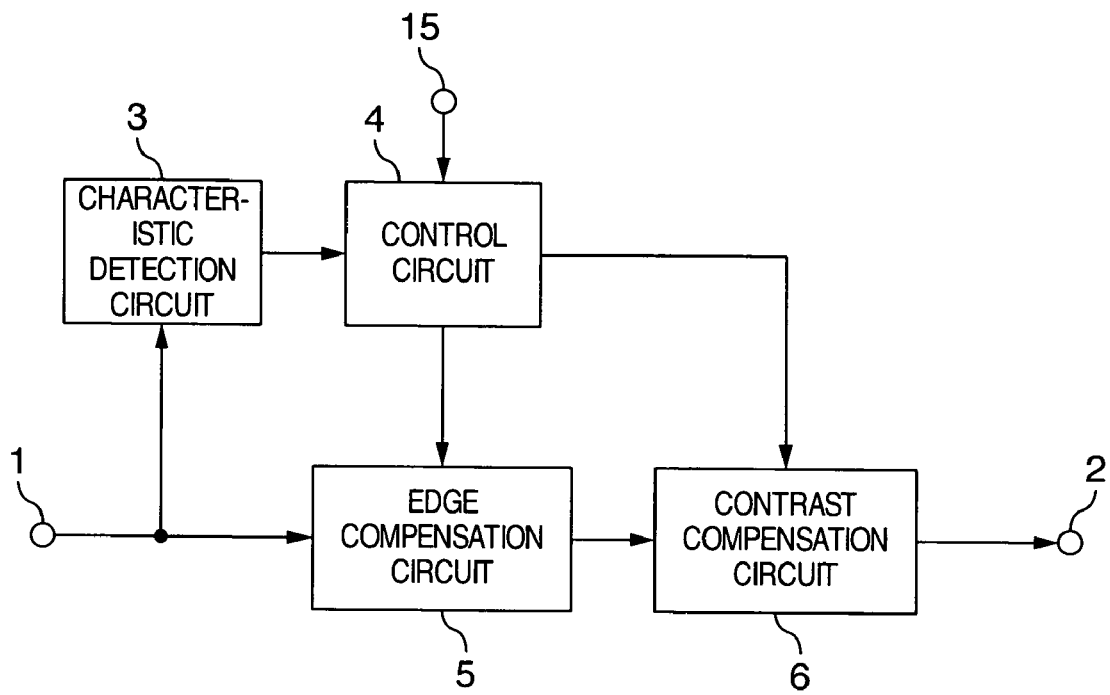
FIG. 5 is a block diagram showing an embodiment of a video signal processing apparatus according to this invention.
Figure 6A:
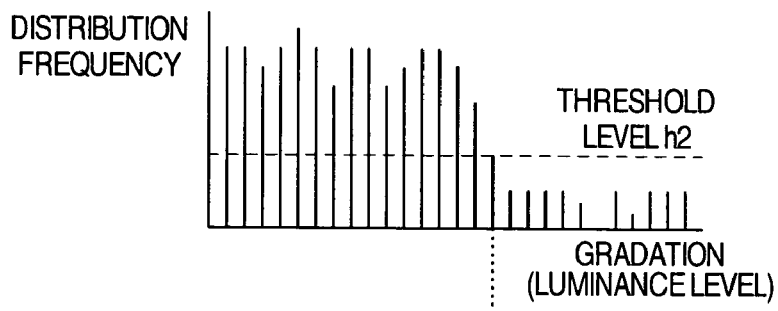
FIGS. 6A to 6D show operation of a video signal processing apparatus according to this invention.
Figure 6B:
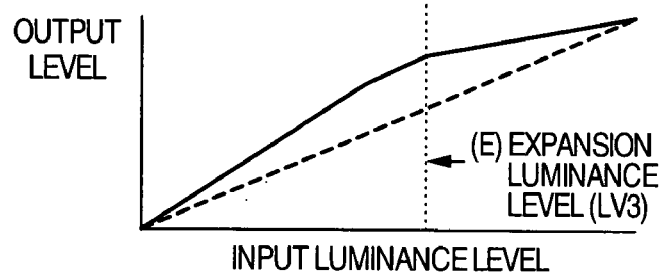
Figure 6C:
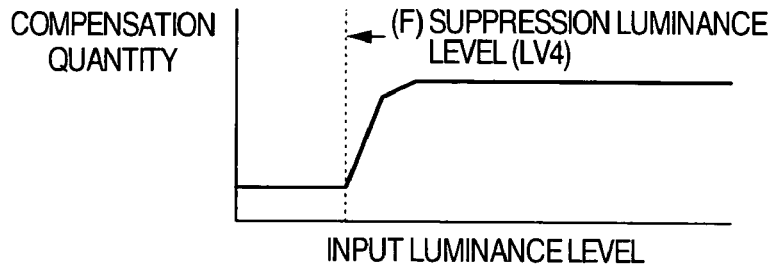
Figure 6D:
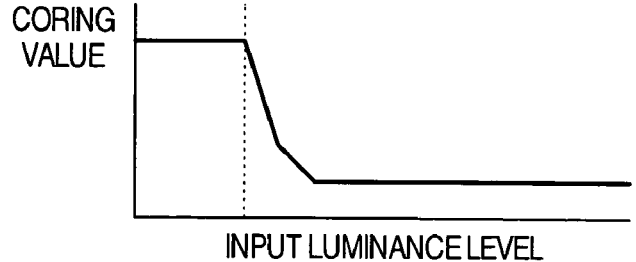

Another embodiment of this invention will now be described with reference to FIG. 5. In FIG. 5, a suppression luminance level input terminal 15 is added. The same reference numerals as those shown in FIG. 1 have like functions. On the basis of a suppression luminance level set by using the input terminal 15, the control circuit 4 suppresses and controls the edge compensation quantity in the edge compensation circuit 5 at luminance levels lower than the suppression luminance level. The operation example is shown in FIGS. 6A-6D. FIGS. 6A, 6B and 6C show luminance distribution corresponding to one frame of a video signal detected by the characteristic detection circuit 3, input-output characteristics of the contrast compensation circuit 6, and compensation characteristics of the edge compensation circuit 5, respectively in the same way as FIGS. 4A-4C. In order to increase the contrast in a luminance range having high distribution (luminance levels of at least a threshold level h2), the contrast compensation circuit 6 is controlled by the control circuit 4 so as to make inclination of input-output characteristics steeper in the luminance range (a region below a luminance level LV3 indicated by E in FIG. 6B) as shown in FIG. 6B. In the luminance level region having the contrast compensation characteristics made steeper, the edge compensation circuit 5 is controlled so as to make the edge compensation quantity at luminance levels below the suppression luminance level LV4 (a region indicated by F in FIG. 6C) inputted to the input terminal 15 and set by the control circuit 4, smaller than the edge compensation quantity in other regions. FIG. 6D shows an example of the case where the control of the edge compensation is exercised by using the coring quantity. Operation of decreasing the edge compensation quantity is conducted by increasing the coring quantity. As for the control of the edge compensation quantity, it is a matter of course that the gain control may also be used as described above.

Owing to the control heretofore described, it is possible to reduce the noise at low luminance levels where noise is apt to comparatively stand out, and maintain the effect of the edge compensation at high luminance levels. The configuration of this embodiment is advantageous when the low luminance region where the noise becomes apt to stand out is previously found.

Figure 7:
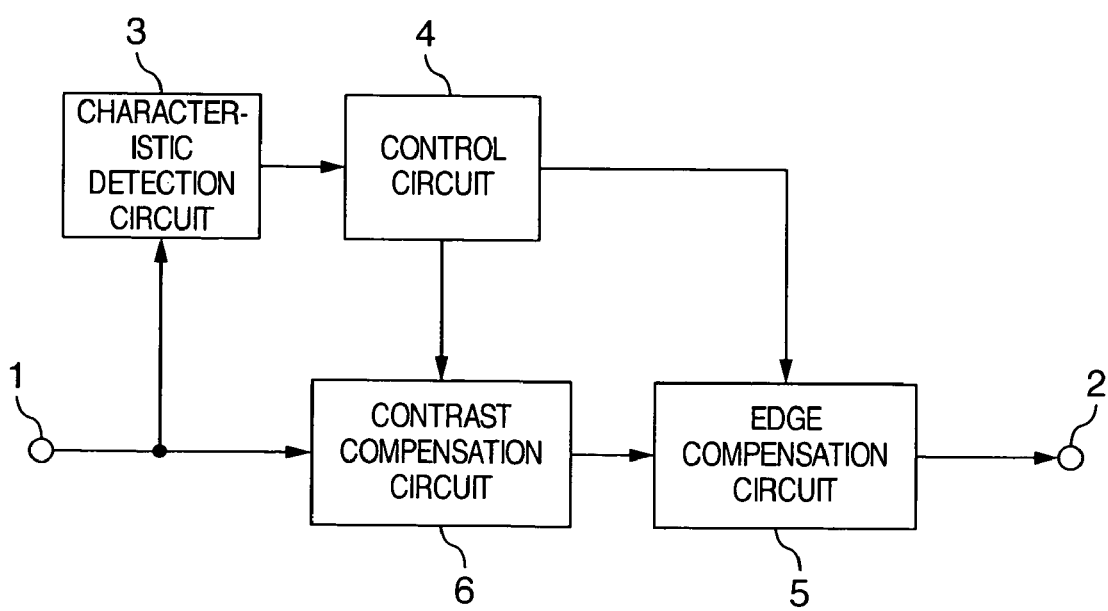
FIG. 7 is a block diagram showing an embodiment of a video signal processing apparatus according to this invention.

Still another embodiment of this invention will now be described with reference to FIG. 7. In FIG. 7, the same reference numerals as those shown in FIG. 1 denote like functions. In this embodiment, the order of the edge compensation circuit 5 and the contrast compensation circuit 6 are interchanged as compared with the embodiment shown in FIG. 1. In this embodiment as well, similar effects can be obtained by conducting the above-described operation.

Figure 8A:
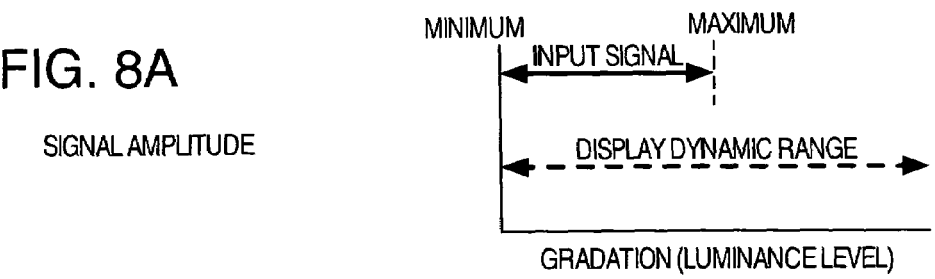
FIGS. 8A to 8C show operation of a video signal processing apparatus according to this invention.
Figure 8B:
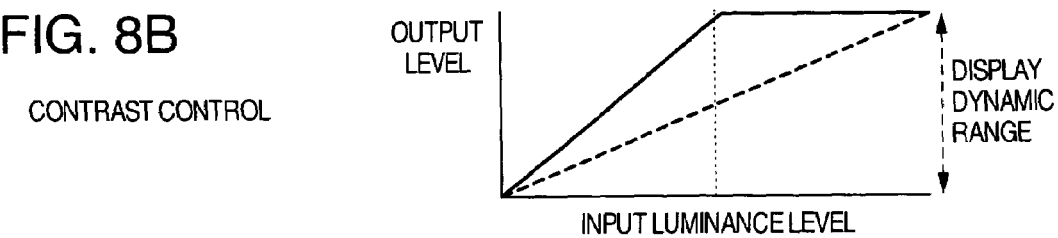
Figure 8C:
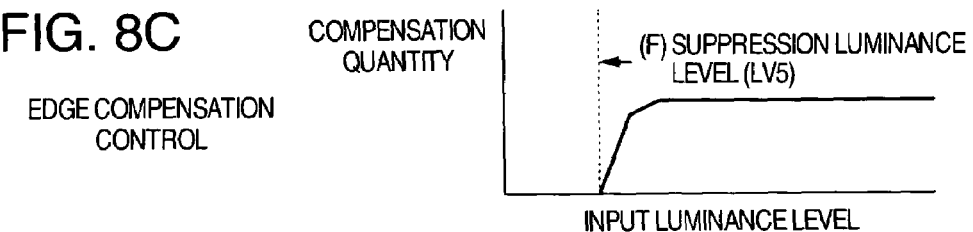

Yet another embodiment of this invention will now be described with reference to FIGS. 8A-8C. This embodiment will be described supposing that this embodiment has the same circuit configuration as that shown in FIG. 5. FIG. 8A shows characteristics of an image detected by the characteristic detection circuit 3, i.e., the amplitude of an input signal, a minimum luminance level and a maximum luminance level. FIG. 8B shows operation of the contrast compensation circuit 6, and the contrast compensation circuit 6 has such characteristics as to expand the input signal amplitude up to a display dynamic range. FIG. 8C shows operation of the edge compensation circuit 5. The suppression luminance level F is previously set in the edge compensation circuit 5. The edge compensation circuit 5 operates so as to decrease the edge compensation quantity at luminance levels lower than the luminance level expanded by the contrast control 6 and lower than the suppression luminance level F.

Owing to the control heretofore described, it is possible to reduce the noise at low luminance levels where noise is apt to comparatively stand out, and maintain the effect of the edge compensation at high luminance levels.

Figure 9:
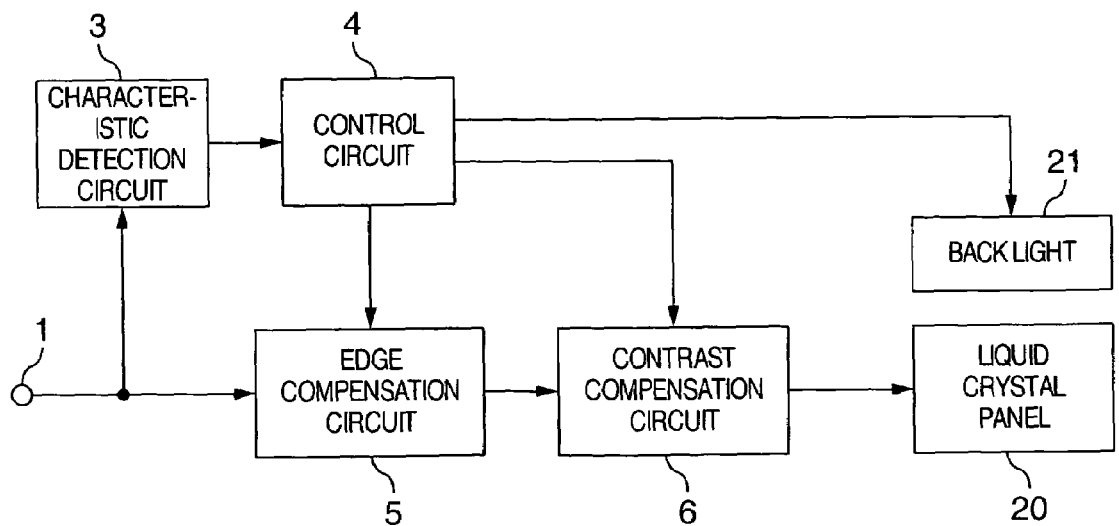
FIG. 9 is a block diagram showing an embodiment of a video signal processing apparatus according to this invention.

As an example of application of a video signal processing apparatus according to this invention to a TV receiver, an embodiment of a TV receiver using a liquid crystal panel is shown in FIG. 9. Except that a liquid crystal panel 20 and a liquid crystal back light 21 are added, FIG. 9 is the same as FIG. 1, and the same reference numerals denote like functions. The edge compensation circuit 5 and the contrast compensation circuit 6 operate in the same way as the operation described with reference to FIG. 1. However, the control circuit 4 controls not only the edge compensation circuit 5 and the contrast compensation circuit 6, but also the liquid crystal back light 21 in accordance with characteristics of the input image. For example, when an image that is dark on the whole is inputted, the control circuit exercises control to lower the intensity of illumination of the liquid crystal back light 21 so as to prevent the whole image from becoming whitish. When an image that is dark on the whole is inputted, then the luminance distribution detected by the characteristic detection circuit 3 exhibits high distribution and consequently the control circuit 4 controls the contrast compensation circuit 6 so as to increase the contrast in the low-luminance region. In other words, when an image that is dark on the whole is inputted in this embodiment, control is exercised so as to lower the intensity of illumination of the liquid crystal back light 21 and increase the contrast in the contrast compensation circuit 6. By thus exercising control, the contrast of a dark image can be increased. As a matter of course, the control circuit 4 exercises control so as to decrease the edge compensation quantity of the edge compensation circuit 5 in the low luminance region.

According to this invention, the contrast compensation circuit 6 and the edge compensation circuit 5 are subject to interlocked adaptive control on the basis of the characteristic quantity of the video signal. When the contrast compensation circuit 6 exercises control so as to increase the contrast, therefore, the edge compensation circuit 5 exercises control so as to decrease the compensation quantity. As a result, the contrast can be increased while reducing the noise amplification.

Furthermore, by previously setting the suppression luminance level in the interlocked control and adaptively controlling the compensation quantity in the edge compensation circuit 5 at luminance levels lower than the suppression luminance level, it is possible to not only maintain the edge compensation effect at high luminance levels, but also suppress the noise at low luminance levels where the noise is apt to comparatively stand out and increase the contrast.

In addition, luminance level-distribution at each gradation level of an image corresponding to one frame is detected by the characteristic detection circuit 3. The contrast compensation circuit 6 exercises control so as to increase the contrast at luminance levels having high distribution frequencies detected by the characteristic detection circuit 3. In addition, the interlocked control is exercised so as to decrease the compensation quantity of the edge compensation circuit at luminance levels increased in contrast. As a result, the contrast can be increased while suppressing the noise.

In addition, it is possible to maintain the edge compensation effect of the original image while suppressing the noise components by controlling the coring quantity and thereby conducting the compensation quantity control in the edge compensation circuit.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A video signal processing apparatus comprising:
   a contrast compensation unit for compensating contrast of a video signal;
   an edge compensation unit for compensating an edge portion of the video signal; and
   a control circuit for controlling the contrast compensation unit and the edge compensation unit on the basis of luminance information of the video signal,
   wherein said control circuit determines a gradation range in which image quality is compensated on the basis of the luminance information of the video signal, and controls said contrast compensation unit so that the contrast of the video signal belonging to the luminance range thus determined is made higher than that of the video signal belonging to another luminance range, and also controls said edge compensation unit so that an edge compensation quantity for the video signal belonging to the luminance range thus determined is made smaller than that in the video signal belonging to another gradation range.

2. A video signal processing apparatus comprising:
   a detection unit for counting a number of pixels in each of a plurality of predetermined gradation ranges on the basis of a video signal applied thereto so as to obtain a histogram indicative of luminance distribution during a preset time period of the video signal;
   a contrast compensation unit for compensating contrast of the video signal;
   an edge compensation unit for compensating an edge portion of the video signal; and
   a control unit for controlling said contrast compensation unit and said edge compensation unit on the basis of the histogram obtained from the detection unit,
   wherein said control unit determines a gradation range in which the number of pixels are made greater than a preset threshold value in the histogram obtained from the detection unit, and controls said contrast compensation unit so that contrast for the video signal applied thereto corresponding to the gradation range thus determined is made higher than that of the video signal corresponding to another gradation range, and also controls said edge compensation unit so that an edge compensation quantity for the video signal corresponding to the gradation range thus determined is made smaller than that of the video signal corresponding to another gradation range.

3. A video signal processing apparatus according to claim 2, wherein the preset time period in the video signal is a time period corresponding to one frame of the video signal.

4. A video signal processing apparatus according to claim 2, wherein said detection unit detects pixels having a luminance level lower than a predetermined luminance level, and said control unit controls the compensation quantity of said edge compensation circuit on the basis of the detection result.

5. A video signal processing apparatus according to claim 2, wherein said edge compensation unit comprises a filter circuit for extracting a signal of an edge portion from the video signal, a coring circuit for conducting coring on the edge signal outputted from the filter circuit, and a gain control circuit for controlling a gain for the edge signal subjected to coring in the coring circuit.

6. A video signal processing apparatus according to claim 5, wherein said control unit controls the edge compensation quantity by controlling a coring quantity in the coring circuit.

7. A video signal processing apparatus according to claim 5, wherein said control unit controls the edge compensation quantity by controlling a gain in the gain control circuit.

8. A video signal processing apparatus according to claim 2, wherein after edge compensation conducted by said edge compensation unit, contrast compensation is conducted by said contrast compensation unit.

9. A video signal processing apparatus according to claim 2, wherein after contrast compensation conducted by said contrast compensation unit, edge compensation is conducted by said edge compensation unit.

10. A television receiver comprising:
    a contrast compensation unit for compensating contrast of a video signal;
    an edge compensation unit for compensating an edge portion of the video signal;
    a control circuit for controlling said contrast compensation unit and said edge compensation unit on the basis of luminance information of the video signal; and
    a display unit of pixel selection type for displaying an image based on the video signal which is compensated in contrast by said contrast compensation unit and compensated in edge by said edge compensation unit,
    wherein said control circuit determines a gradation range in which image quality is compensated on the basis of luminance information of the video signal, and controls said contrast compensation unit so that contrast of the video signal belonging to the luminance range thus determined is made higher than that of the video signal belonging to another luminance range, and also controls said edge compensation unit so that edge compensation quantity for the video signal belonging to the luminance range thus determined is made smaller than that of the video signal belonging to another gradation range.

11. A television receiver comprising:
    a detection unit responsive to a video signal applied thereto for counting a number of pixels belonging to each of a plurality of predetermined gradation ranges so as to obtain a histogram indicative of luminance distribution of the video signal in a preset time period;
    a contrast compensation unit for compensating contrast of the video signal;
    an edge compensation unit for compensating an edge portion of the video signal;

a control unit for controlling said contrast compensation unit and said edge compensation unit on the basis of the histogram obtained from said detection unit; and a display unit of pixel selection type for displaying an image based on the video signal which is compensated in contrast by said contrast compensation unit and compensated in edge by said edge portion compensation unit wherein said control unit determines a gradation range in which the number of pixels thus counted are made larger than a preset threshold value in the histogram obtained from said detection unit, and controls said contrast compensation circuit so that contrast for the video signal applied thereto corresponding to the luminance range thus determined is made higher than that of the video signal corresponding to another gradation range, and also controls said edge compensation unit so that an edge compensation quantity for the applied video signal corresponding to the gradation range thus determined is made smaller than that of the video signal corresponding to another gradation range.

12. A video signal processing apparatus comprising:

a detection unit for counting a number of pixels in each of a plurality of predetermined gradation ranges on the basis of a video signal applied thereto so as to obtain a histogram indicative of luminance distribution during a preset time period of the video signal;

a contrast compensation unit for compensating contrast of the video signal;

an edge compensation unit for compensating an edge portion of the video signal; and a control unit for controlling said contrast compensation unit and said edge compensation unit on the basis of the histogram obtained from the detection unit, wherein said control unit determines a gradation range in which the number of pixels are made greater than a preset threshold value in the histogram obtained from the detection unit, and controls said contrast compensation unit so that contrast for the video signal applied thereto corresponding to the gradation range thus determined is made higher than that of the video signal corresponding to another gradation range, and also controls said edge compensation unit so that an edge compensation quantity for the video signal corresponding to the gradation range thus determined is made smaller than that of the video signal corresponding to another gradation range, and wherein after edge compensation conducted by said edge compensation unit, contrast compensation is conducted by said contrast compensation unit.

* * * * *